US006285339B1

United States Patent
McGill

(12) United States Patent
(10) Patent No.: US 6,285,339 B1
(45) Date of Patent: Sep. 4, 2001

(54) TWO AXIS POSITIONER WITH ZERO BACKLASH

(75) Inventor: Jeffrey John McGill, Roy, UT (US)

(73) Assignee: L-3 Communications Corporation, Salt Lake City, UT (US)

( * ) Notice: Subject to any disclaimer, the term of this patent is extended or adjusted under 35 U.S.C. 154(b) by 0 days.

(21) Appl. No.: 09/543,966

(22) Filed: Apr. 7, 2000

(51) Int. Cl.$^7$ .................................................... H01Q 3/02
(52) U.S. Cl. ...................... 343/882; 343/880; 248/278.1; 248/661
(58) Field of Search .................................... 343/882, 880, 343/881, 878; 248/521, 661, 662, 183.1, 278.1; H01Q 3/02

(56) References Cited

U.S. PATENT DOCUMENTS

| | | | |
|---|---|---|---|
| 2,460,286 | * 2/1949 | Hansen et al. | 343/882 |
| 4,295,621 | * 10/1981 | Siryj | 343/882 |
| 4,396,919 | 8/1983 | Speicher | 343/765 |
| 4,580,461 | 4/1986 | Sears et al. | 74/479 |
| 5,419,521 | * 5/1995 | Matthews | 343/882 |
| 5,875,685 | 3/1999 | Storaasli | 74/490.1 |

OTHER PUBLICATIONS

Brochure, Orbit Advanced Technologies, "Airborne Positioners and & Controllers—zero right in", undated, four pages.

"Precision Gearing": Theory and Practice Michalec, George W., John Wileg & Sons, New York, London, Sydney, 1966, pp. 252–287.

* cited by examiner

Primary Examiner—Hoanganh Le
(74) Attorney, Agent, or Firm—Perman & Green, LLP

(57) ABSTRACT

Two-axis positioning apparatus utilizes a yoke including a hub mounted on a base for rotation about a first axis, an integral bight member extending radially away from the hub in opposite directions and a pair of upstanding legs distant from the hub extending away from the bight member at spaced apart locations. A load, such as an antenna, extends between and is mounted on the upstanding legs of the yoke member for rotation about a second axis distant from the bight member. A first drive system rotatably positions the yoke about the first axis and a second drive system intermediate the yoke and the load includes a first drive component rotatable about the first axis for rotatably positioning the load about the second axis as a function of the difference in angular movement of the support member about the first axis and the angular movement of the first drive component about the first axis. A spring mechanism biases the load relative to the yoke thereby biasing the second drive system against the first drive system to minimize lost motion in both drive systems.

12 Claims, 5 Drawing Sheets

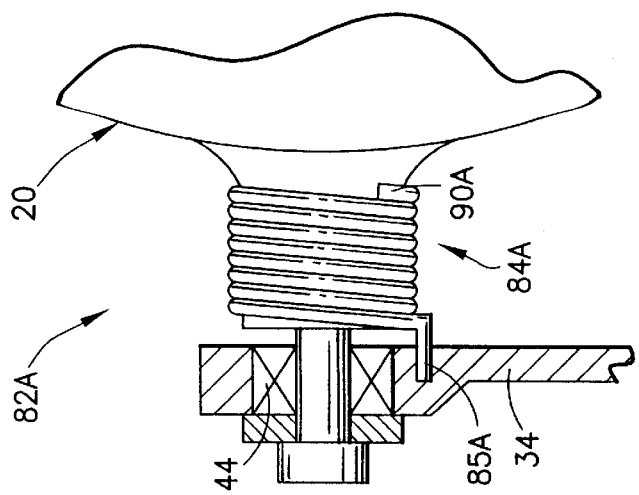
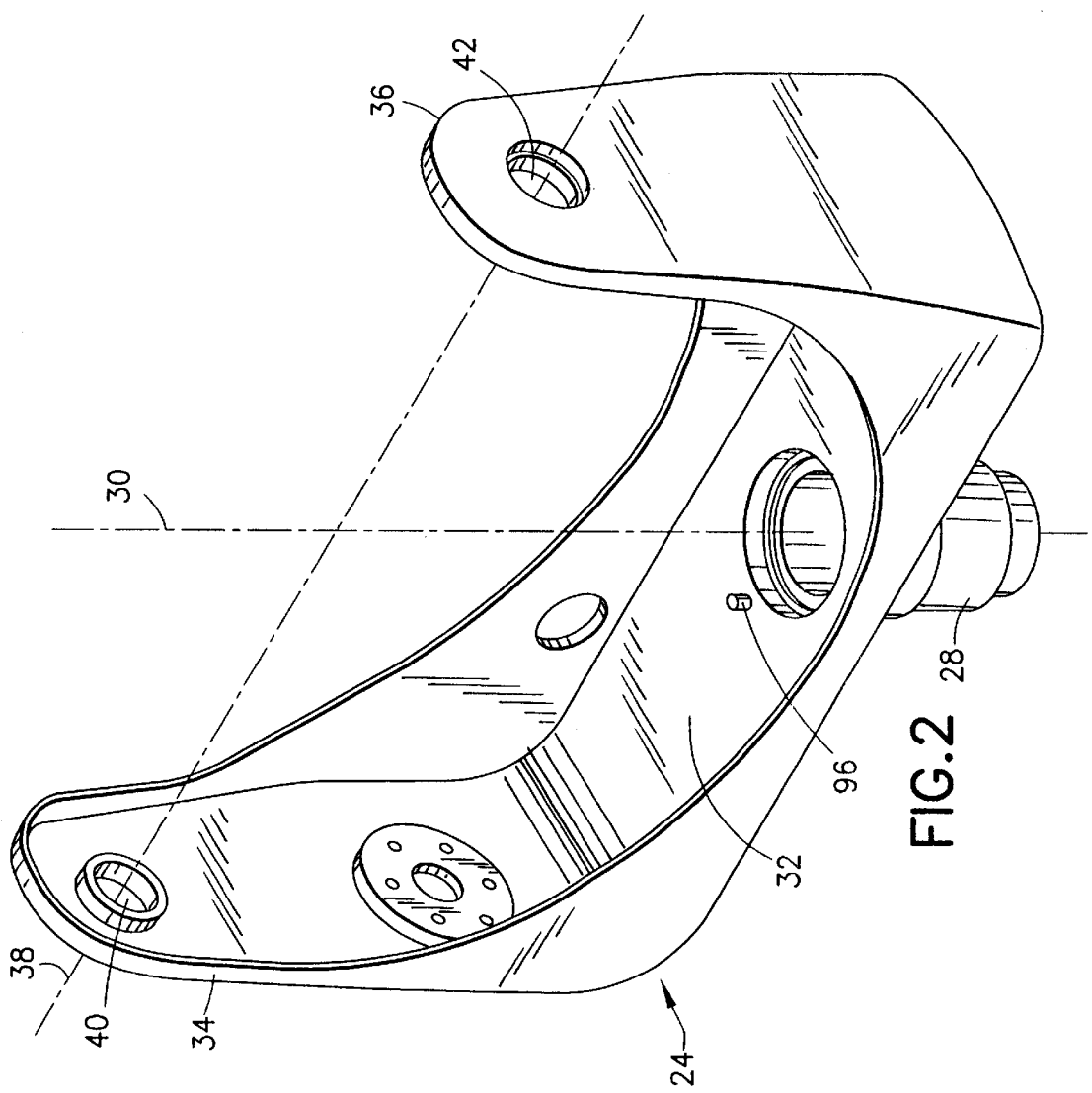

TWO AXIS POSITIONER WITH ZERO BACKLASH

BACKGROUND OF THE INVENTION

1. Field of the Invention

The present invention relates to multi-axis positioning equipment and, more particularly, to a zero-backlash, elevation-over-azimuth, two-axis positioner that is capable of continuous 360°, rotation in azimuth and limited rotation (130°, for example) in elevation.

2. Prior Art

A pair of patents will be mentioned that are exemplary, but not exhaustive, of the prior art in the field with which the present invention is concerned. U.S. Pat. No. 4,580,461 to Sears et al. discloses a gimbal mounting arrangement which provides at least two rotational axes about which a load such as an antenna or optical transducer may be gimbaled. The gimballing arrangement permits both axes of rotation to intersect at a point within the load being gimbaled thereby minimizing the rotational inertia of the load and of the gimbal mechanism itself. Because the rotational inertia is minimized, relatively rapid scan rates can be achieved using only relatively low powered drive inputs. U.S. Pat. No. 5,875,685 to Storaasli discloses a positioner including an output platform and a two-axis bearing suspension which permits the output platform to rotate about two orthogonal axes. The output platform is positioned by a pair of actuators which are mounted, as is the bearing suspension, to a positioner base. The actuators include bevel gears which engage ratchets to couple the actuators and the platform.

Most existing elevation-over-azimuth, two-axis positioners have two separate drives for the azimuth and elevation axes. The elevation axis drive is usually located on the far side of the azimuth axis from the stationary base, requiring an electrical slipring to allow for continuous azimuth rotation. The slipring is typically a very expensive component. Many known constructions of our elevation-over-azimuth, two-axis positioners use small, high-speed electric motors with geartrains to drive the low-speed output axes. Geartrains have one major disadvantage—backlash. Excessive backlash can cause problems with stability in a closed-loop control system, and backlash adds to position error.

Existing elevation-over-azimuth, two-axis positioners in which the position of the elevation axis is determined by the position of the elevation drive in the base relative to the position of the azimuth drive in the base have a major disadvantage. This is that any backlash in the azimuth drive would add to the backlash in the elevation drive, increasing the total backlash at the elevation output axis.

Direct drive electric motors have been used to eliminate backlash. They generally require more size, mass, and input power than a small, high-speed motor with a geartrain for a given output power with a slow-moving output axis.

Many methods have been used for control of backlash in geartrains. George W. Michalec's book Precision Gearing: Theory and Practice, published in 1966, has a good description of many different methods. Most have disadvantages such as increased size, weight, and cost. Examples are split, spring-loaded scissor gears and the use of auxiliary geartrains.

It was with knowledge of the foregoing that the present invention has been conceived and is now reduced to practice.

SUMMARY OF THE INVENTION

The present invention is directed toward a zero-backlash, elevation-over-azimuth, two-axis positioner that is capable of continuous 360° rotation in azimuth and limited rotation (approximately 130°, for example) in elevation. This positioning apparatus utilizes a yoke including a hub mounted by means of bearings on a base for rotation about a first axis, an integral bight member extending radially away from the hub in opposite directions and a pair of upstanding legs distant from the hub extending away from the bight member at spaced apart locations. A load, such as an antenna, extends between and is mounted by means of bearings on the upstanding legs of the yoke member for rotation about a second axis distant from the bight member. A first drive system rotatably positions the yoke about the first axis and a second drive system intermediate the yoke and the load includes a first drive component rotatable about the first axis for rotatably positioning the load about the second axis as a function of the difference in angular movement of the support member about the first axis and the angular movement of the first drive component about the first axis. A spring mechanism biases the load relative to the yoke thereby biasing the second drive system against the first drive system to minimize lost motion in both drive systems.

The motors, gears, position feedback devices, and a controller circuit card for closed-loop positioning of the two orthogonal axes are located in the base. Note that this allows the continuous 360° rotation in azimuth without the use of sliprings. The elevation axis is driven from the base by a mechanism, which in the initial sketch includes a cable and a plurality of pulleys. This mechanism could comprise, for example, a cam, a linkage, a gear train, or other suitable devices instead of the cable and pulleys. The important feature of this mechanism is that the position of the elevation axis is determined by the position of the elevation drive in the base relative to the position of the azimuth drive in the base. The novel part of the invention is the addition of a spring between the load and the yoke.

The spring could take any one of a wide variety of constructions. It could be a helical torsion spring (the form which will be described below as an example), a hairspring, a Neg'ator® type constant force spring, or even a helical extension spring with a cable and pulley. This spring serves to provide a continuous torque preload on the two drivetrains. If the applied torque on the load does not exceed the preload of the spring, this preload will remove from both output axes lost motion due to geartrain backlash and clearances between parts without the additional cost, size, and weight of other known backlash control techniques and constructions.

The purpose of the invention, then, is to position a load in a desired angular orientation with adequate stability and sufficiently small position error. One possible application, and the one primarily described in the ensuing disclosure, is for pointing a directional antenna. It could also be used in a tracking antenna system. Other potential applications include positioning a laser and/or optics for an optical data link. It might also be used in machine tool and robotics applications or for aiming a weapon.

The new and different part of the invention is the addition of a spring between the load and the yoke. This spring would provide a continuous load on the two drivetrains, removing lost motion due to geartrain backlash and clearances between parts.

The concept of eliminating a slipring and driving the elevation axis from the base through a mechanism is not new and commercially available apparatus exists which is so constructed.

Assuming that a two-axis positioner requires two motors and two geartrains, the major advantage over past practice is that this invention uses a single spring to apply a continuous load to these two required geartrains. This eliminates from both axes the lost motion due to gear backlash and part clearances without the additional cost, size, and weight of other backlash control methods.

A primary feature, then, of the present invention is the provision of novel multi-axis positioning equipment.

Another feature of the present invention is the provision of such multi-axis positioning equipment in the form of a zero-backlash, elevation-over-azimuth, two-axis positioner that is capable of continuous 360° rotation in azimuth and limited rotation in elevation.

Still another feature of the present invention is the provision of such multi-axis positioning equipment which includes a yoke mounted on a base for rotation about a first axis, a load mounted on the support member for rotation about a second axis extending transverse of the first axis, a first drive system for rotatably positioning the support member about the first axis, a second drive system intermediate the support member and the load including a first drive component rotatable about the first axis for rotatably positioning the load about the second axis as a function of the difference in angular movement of the support member about the first axis and the angular movement of the first drive component about the first axis, and a force imparting mechanism biasing the load relative to the support member thereby biasing the second drive system against the first drive system to minimize lost motion in both drive systems.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

BRIEF DESCRIPTION OF THE DRAWINGS

The foregoing aspects and other features of the present invention are explained in the following description, taken in connection with the accompanying drawings, wherein:

FIG. 2 is a detail perspective view of a component illustrated in FIG. 1;

FIG. 3A is a detail elevation view illustrating a modified form of the structure illustrated in FIG. 3;

DETAILED DESCRIPTION OF THE PREFERRED EMBODIMENT

Positioners employing multi-axis gimbal mounts are widely used for positioning antennas, optical sensors, scientific instruments, lasers, weapons, and other such devices. Gimbal mounts provide relative ease of movement so that, for example, a gimbal-mounted satellite antenna may be positioned to track a fixed target on earth as the satellite drifts by overhead or to track another satellite antenna. As the target moves relative to the gimbal-mounted antenna, the antenna is moved to maintain the target within the antenna's relatively narrow beam. To be effective especially over long distances this positioning must be precise and stable. However, all known systems are susceptible to backlash, manufacturing complexity, and wear, backlash and friction uncertainties can greatly complicate the design of an associated position control system.

Figure 1:
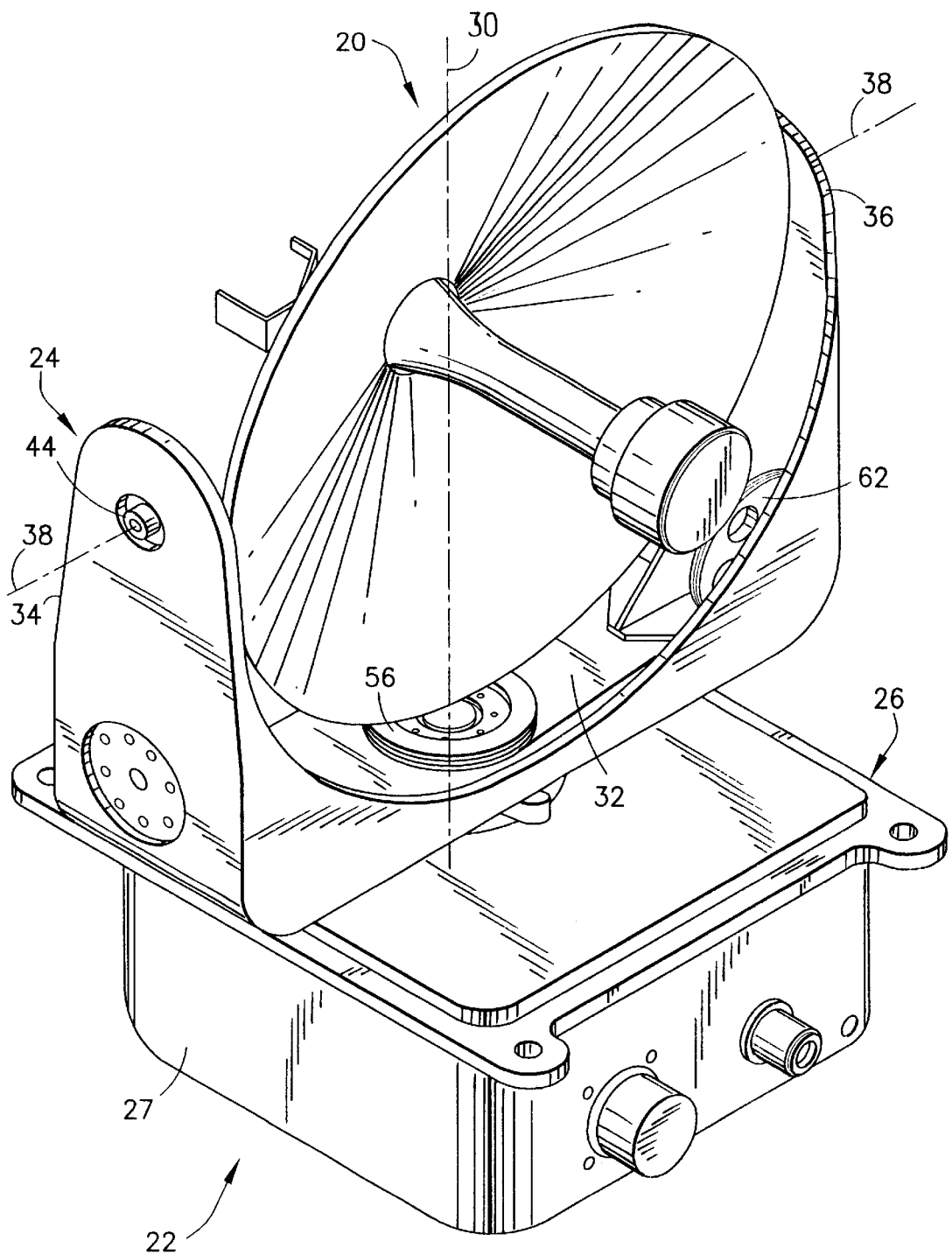
FIG. 1 is a perspective view of an antenna in combination with a two-axis positioning apparatus embodying the present invention.

Referring initially to FIG. 1, there is shown a perspective view of a load, here illustrated as an antenna 20, and two-axis positioning apparatus 22 incorporating features of the present invention. Although the present invention will be described with reference to embodiments shown in the drawings, it should be understood that the present invention can be embodied in many alternative embodiments. In addition, any suitable size, shape or type of elements or materials could be used. Further, the positioning apparatus 22 may be used in combination with a wide range of devices other than an antenna such as, but not limited to, optical sensors, scientific instruments, lasers, and weapons.

The positioning apparatus 22 includes a support member, or yoke, 24 mounted on a base 26 to which is attached a housing 27 containing the various drive components for operating the apparatus. Turning to FIG. 2 but with continued attention to FIG. 1, the yoke 24 is seen to include a hub 28 mounted on the base 26 for rotation about an azimuth axis 30. While the azimuth axis 30 is indicated as an upright axis, it need not necessarily be such. A bight member 32 is integral with the hub 28 and extends radially away from the hub in opposite directions. A pair of generally parallel upstanding legs 34, 36 which are distant from the hub 28 extend away from the bight member 32 at spaced apart locations. The antenna 20 extends between the upstanding legs of the yoke and is mounted on them with the use of bearings for rotation about an elevation axis 38 distant from, and generally parallel to, the bight member.

Suitable aligned bores 40, 42 in the upstanding legs 34, 36, respectively, are positioned to receive spaced apart bearing members 44 of the antenna 20 at opposed locations distant from the bight member enabling rotation of the antenna about the elevation axis 38.

Figure 3:
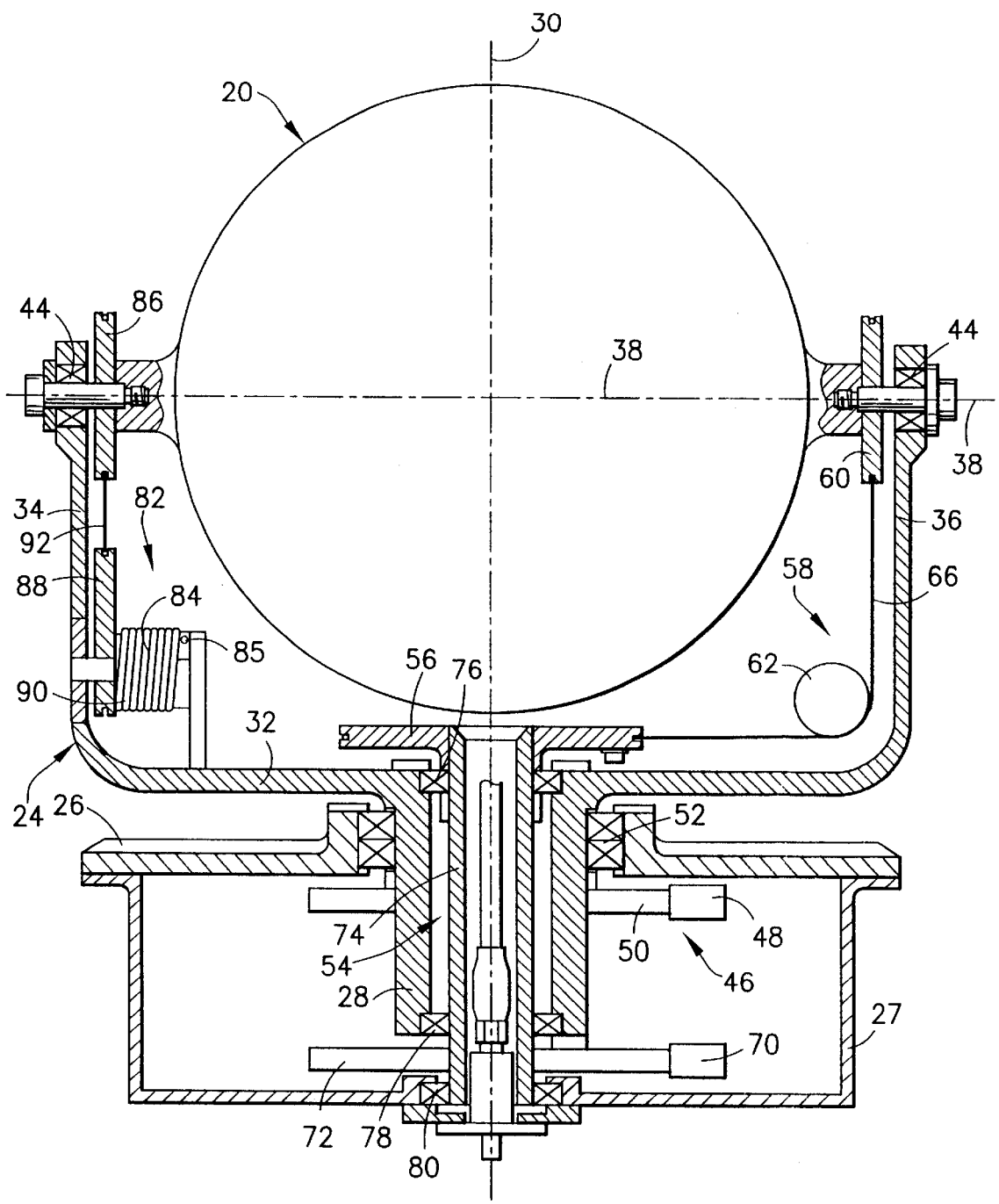
FIG. 3 is an elevation view of the assembly illustrated in FIG. 1, certain parts being cut away and shown in section.

As seen in FIG. 3, a first drive system 46 serves to rotatably position the yoke 24 about the azimuth axis 30. Within the housing 27, a motor (not shown) drives an azimuth pinion 48 drivingly engaged with an azimuth bull gear 50 fixed on the hub 28 and the hub is rotatably mounted on the base 26 by means of a bearing 52.

With continuing reference, especially, to FIG. 3, a second drive system 54 serves to rotatably position the antenna 20 about the elevation axis 38 as a function of the difference in angular movement of the yoke 24 about the azimuth axis 30 and the angular movement of a first drive component 56 about the azimuth axis. The second drive system 54, which is intermediate the yoke 24 and the antenna 20, includes a pulley assembly 58 which operatively connects the antenna 20 and the second drive system 54.

The pulley assembly 58 includes a load pulley 60 which is fixed to the antenna 20 adjacent the bearing member 44 on the leg 36, a drive pulley which is the earlier-mentioned first drive component 56 on the second drive system 54, and a set of idler pulleys 62 (FIGS. 3 and 4) mounted on the bight member 32 intermediate the load pulley and the drive pulley for rotation about an axis 64 which is perpendicular to both the axes 30 and 32. A flexible drive cable 66, or the like, is operatively engaged with the load pulley 60, with the drive pulley 56, and with the idler pulleys 62 such that rotation of the drive pulley 56 relative to the yoke 24 results in rotation of the antenna 20 about the second axis 38.

Again, as seen in FIG. 3, within the housing 27, a motor (not shown) drives an elevation pinion 70 which is drivingly engaged with an elevation bull gear 72 fixed on a tubular shaft 74. The tubular shaft 74 is coaxial with the hub 28 and is rotatably supported relative to the hub by means of bearings 76, 78 and mounted on the housing 27 by means of bearing 80. The drive pulley 56 is fixed on the tubular shaft 74 at a location distant from the bearing 80. Thus, as earlier noted, with operation of the pinion 70 and bull gear 72, the drive pulley 56 is rotated about the first axis 30 relative to the yoke 24 for rotatably positioning the antenna 20 about the second axis 38. However, elevational movement of the antenna only occurs if there is a difference in angular movement of the yoke 24 and of the drive pulley 56 about the axis 30. Thus, if the tubular shaft 74 and the hub 28 rotate in unison, the elevation angle of the antenna remains constant.

Figure 4:
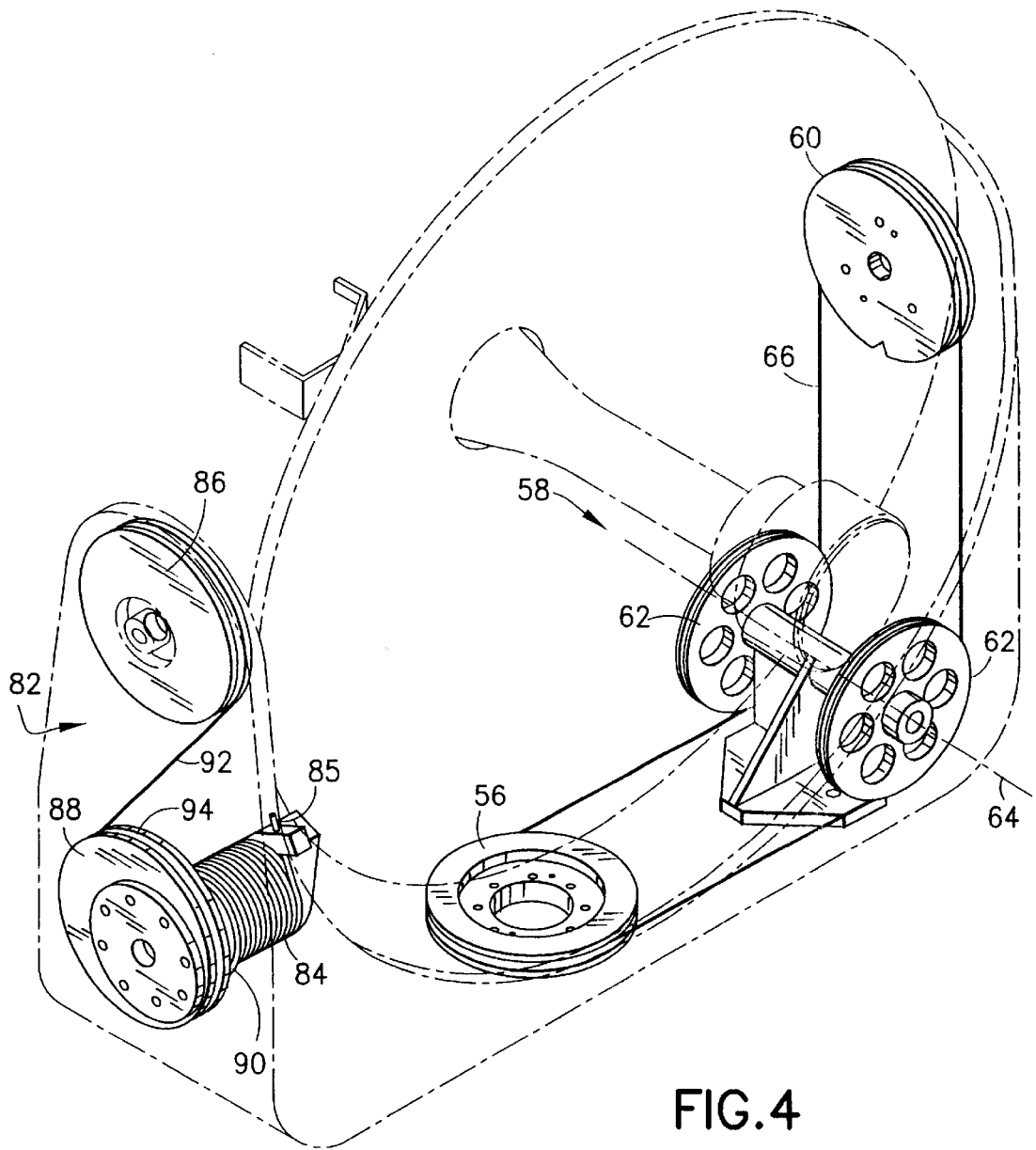
FIG. 4 is a detail perspective view of components illustrated in FIG. 3.

A force imparting mechanism 82 operates to bias the antenna 20 relative to the yoke 24 and thereby biases the second drive system 54 against the first drive system 46. This has the effect of minimizing lost motion in both drive systems. To this end, the force imparting mechanism 82 includes a torsion spring 84 which, as illustrated in FIGS. 3 and 4, has a longitudinal axis which is parallel to and spaced from the second axis 38. One end 85 of the torsion spring 84 is fixed to the yoke 24. A first force pulley 86 aligned with the axis 38 is fixed on the antenna adjacent the bearing 44 on the leg 34. A second force pulley 88 is fixed to an opposite end 90 of the torsion spring 84 and is generally aligned with the longitudinal axis of the torsion spring. A flexible drive cable 92 is operatively engaged with the first and second force pulleys 86, 88, respectively. As seen in FIGS. 3 and 4, the second force pulley 88 is suitably shaped to maintain the application of substantially constant torque to the antenna 20 as rotation of the antenna progresses.

The off-axis positioning of the torsion spring 84 relative to the antenna is also a preferred design intended to free the system of components in the crowded region of the elevation axis 38. However, the invention also encompasses constructions represented by a modified force imparting mechanism 82A (see FIG. 3A) which locate a torsion spring 84A on the elevational axis 38. Viewing FIG. 3A, opposed ends 85A, 90A of the torsion spring 84A, for example, are connected, respectively, to the yoke 24 and to the antenna 20 at the bearing member 44 on the leg 34.

Figure 5:
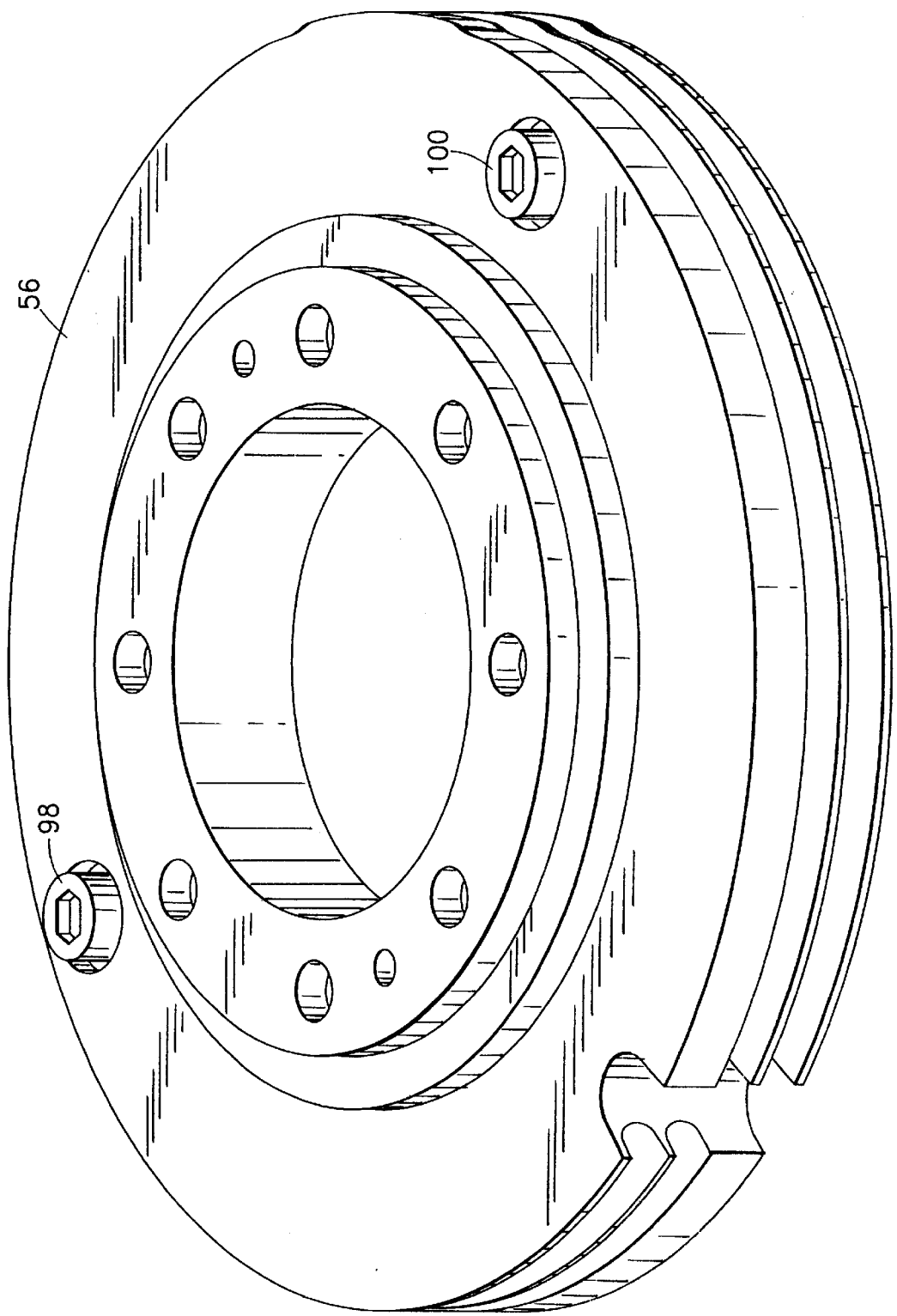
FIG. 5 is detail perspective view of the underside of a component illustrated in FIGS. 1, 3, and 4.

A plurality of stop members are provided on the first and second drive systems 46, 54, respectively, for establishing the limits of rotational travel of the antenna 20 about the elevation axis 38. As seen especially in FIGS. 2, 3, and 5, a stop member 96 associated with the first drive system 46 may take the form of a screw head of a fastener threadedly engaged with the bight 32 of the yoke 24 at a predetermined radial distance from the azimuthal axis 30. In a similar fashion, a pair of second stop members 98, 100 are associated with the second drive system 54 and include a pair of circumferentially spaced screw heads of fasteners threadedly engaged with the drive pulley 56. Each of the stop members 98, 100 is fixed on the drive pulley at the same radial distance from the axis 30 as the stop member 96.

With relative rotation about the azimuthal axis 30 between the drive pulley 56 and the yoke 24 in one direction, the stop member 96 is engageable with the stop member 98 to define one extreme elevational position of the antenna 20 and with relative rotation about the azimuthal axis 30 between the drive pulley 56 and the yoke 24 in the opposite direction with the stop member 100 to define the other extreme position of the antenna. Notwithstanding the preceding description, it should be recognized the stop members may be located elsewhere and on other components than described while yet providing the desired result.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. Two-axis positioning apparatus comprising:
   a support member mounted on a base for rotation about a first axis;
   a load mounted on the support member for rotation about a second axis extending transverse of the first axis;
   a first drive system for rotatably positioning the support member about the first axis;
   a second drive system intermediate the support member and the load including a first drive component rotatable about the first axis for rotatably positioning the load about the second axis as a function of the difference in angular movement of the support member about the first axis and the angular movement of the first drive component about the first axis; and
   a force imparting mechanism biasing the load relative to the support member thereby biasing the second drive system against the first drive system to minimize lost motion in both drive systems.

2. Two-axis positioning apparatus as set forth in claim 1 wherein said support member is a yoke including:
   a hub mounted on the base for rotation about the first axis;
   a bight member integral with the hub extending radially away from the hub in opposite directions; and
   a pair of upstanding legs distant from the hub extending away from the bight member at spaced apart locations, the load extending between and mounted on the upstanding legs of the yoke member for rotation about the second axis distant from the bight member.

3. Two-axis positioning apparatus as set forth in claim 2 wherein the force imparting mechanism includes a torsion spring having opposed ends connected, respectively, to the yoke and to the load.

4. Two-axis positioning apparatus as set forth in claim 3 wherein the load includes first and second spaced apart bearing members mounted, respectively, on the upstanding legs at opposed locations distant from the bight member;
   wherein the force imparting mechanism includes a torsion spring having opposed ends connected, respectively, to the yoke and to the load at the first bearing member.

5. Two-axis positioning apparatus as set forth in claim 4 wherein the second drive system includes a pulley assembly operatively connecting the load and the second drive system.

6. Two-axis positioning apparatus as set forth in claim 5 wherein the pulley assembly includes:
   a load pulley on the load adjacent the second bearing member;

a drive pulley on the second drive system;

a set of idler pulleys intermediate the load pulley and the drive pulley; and a flexible drive cable operatively engaged with the load pulley, with the drive pulley, and with the drive belt;

whereby rotation of the drive pulley results in rotation of the load about the second axis.

7. Two-axis positioning apparatus as set forth in claim 6 including:

first and second stop means on the first and second drive systems, respectively, for establishing the limits of rotational travel of the load about the second axis;

wherein the first stop means includes a first stop member fixed on the bight member adjacent the hub; and wherein the second stop means includes a pair of circumferentially spaced second stop members, each of the second stop members fixed on the drive pulley at the same radial distance from the first axis as the first stop member;

whereby the first stop member is engageable with one of the second stop members to define one extreme position of the load and with another of the second stop members to define another extreme position of the load.

8. Two-axis positioning apparatus as set forth in claim 3 wherein the load includes first and second spaced apart bearing members aligned with the second axis and mounted, respectively, on the upstanding legs at opposed locations distant from the bight member;

wherein the force imparting mechanism includes a torsion spring displaced from the second axis and having opposed ends with one end fixed to the yoke and the other end operatively connected to the load at the first bearing member.

9. Two-axis positioning apparatus as set forth in claim 8 wherein the torsion spring has a longitudinal axis which is parallel to and spaced from the second axis;

a first force pulley on the load adjacent the first bearing;

a second force pulley fixed to the other end of the torsion spring and generally aligned with the longitudinal axis of the torsion spring; and a flexible drive cable operatively engaged with the first and second force pulleys.

10. Two-axis positioning apparatus as set forth in claim 9 wherein the second force pulley is shaped to maintain substantially constant torque being applied to the load as rotation progresses.

11. Two-axis positioning apparatus as set forth in claim 1 wherein the load includes an antenna.

12. Two-axis positioning apparatus as set forth in claim 1 including:

first and second stop means on the first and second drive systems, respectively, for establishing the limits of rotational travel of the load about the second axis.

* * * * *